US005151662A

United States Patent [19]

Hanna

[11] Patent Number: 5,151,662

[45] Date of Patent: Sep. 29, 1992

[54] CIRCUIT AND METHOD OF SIGNAL DIFFERENTIATION

[75] Inventor: John E. Hanna, Mesa, Ariz.

[73] Assignee: Motorola, Inc., Schaumburg, Ill.

[21] Appl. No.: 720,069

[22] Filed: Jun. 24, 1991

[51] Int. Cl.[5] .......... H02J 7/00; G06G 7/12

[52] U.S. Cl. .......... 328/127; 307/490; 307/494; 328/149

[58] Field of Search .......... 328/127, 167, 149; 307/529, 520, 490, 494; 333/19; 330/302, 306

[56] References Cited

U.S. PATENT DOCUMENTS

| | | | |
|---|---|---|---|
| 3,993,959 | 11/1976 | Boctor | 307/491 |
| 4,356,558 | 10/1982 | Owen et al. | 328/167 |
| 4,366,508 | 12/1982 | Crean et al. | 358/451 |
| 4,642,541 | 2/1987 | El-Sadi | 328/167 |
| 4,737,724 | 4/1988 | Porrot | 328/167 |
| 4,785,252 | 11/1988 | Fuji et al. | 328/167 |
| 4,918,338 | 4/1990 | Wong | 328/127 |
| 4,954,732 | 9/1990 | Surauer et al. | 328/167 |
| 4,999,522 | 3/1991 | Deville | 328/167 |
| 5,006,810 | 4/1991 | Popescu | 328/167 |

*Primary Examiner*—Janice A. Howell
*Assistant Examiner*—Sinh Tran
*Attorney, Agent, or Firm*—Robert D. Atkins

[57] ABSTRACT

A differentiator circuit is provided with a subtracter circuit connected to the input and output of the final stage of a main signal processing filter, the latter of which processes an input signal for providing a filtered output signal. The difference between the input and output signals of the final stage of the main signal processing filter provides a differentiated output signal having the same natural frequency and damping factor as the filtered output signal.

11 Claims, 2 Drawing Sheets

-PRIOR ART-

CIRCUIT AND METHOD OF SIGNAL DIFFERENTIATION

BACKGROUND OF THE INVENTION

This invention relates in general to differentiator circuits and, more particularly, to a differentiator using a signal processing filter.

Differentiator circuits are commonly used, for example, in computer disk drive applications to detect the peak of an analog signal received from the read/write head. It is important to identify the time of occurrence of the peak of the analog signal to maximize the signal-to-noise ratio for the resulting digital logic signal. The peak of the analog signal corresponds to a zero slope, or equivalently the point of zero rate of signal change per unit time. Thus, by taking the derivative the analog signal from the read/write head of the disk drive and detecting the zero crossing of the differentiated signal, the peak of the analog signal may be determined.

In disk drive applications, the differentiator is typically a two-pole filter stage placed in parallel with the final two-pole stage of a Bessel-type or elliptic-type main signal processing filter. The differentiating filter stage has poles with the same natural frequency and damping factor as the final two-pole stage of the Bessel filter and includes a zero in the numerator of the corresponding transfer function for providing the differentiation operation.

One principal problem with the conventional differentiator is the excessive area consumed by the duplicate filter components in the parallel differentiating stage. The pole-generating capacitors tend to be physically very large. Another difficulty is the effort in matching the natural frequency and damping factor between the final filter stage and the differentiator stage.

Hence, what is needed is an improved differentiator which eliminates the additional two-pole filter stage in parallel with the primary filter to reduce the space allocation in an integrated circuit.

SUMMARY OF THE INVENTION

Briefly stated, the invention comprises a circuit for differentiating an input signal comprising a first circuit for filtering the input signal and providing a filtered output signal, and a second circuit for subtracting the filtered output signal of the first circuit as applied at a first input from the input signal as applied at a second input for providing a differentiated output signal at an output.

In another aspect, the present invention is a method of differentiating an input signal comprising the steps of filtering the input signal for providing a filtered output signal, and subtracting the filtered output signal from the input signal for providing a differentiated output signal.

DETAILED DESCRIPTION OF THE PRIOR ART

Figure 1:
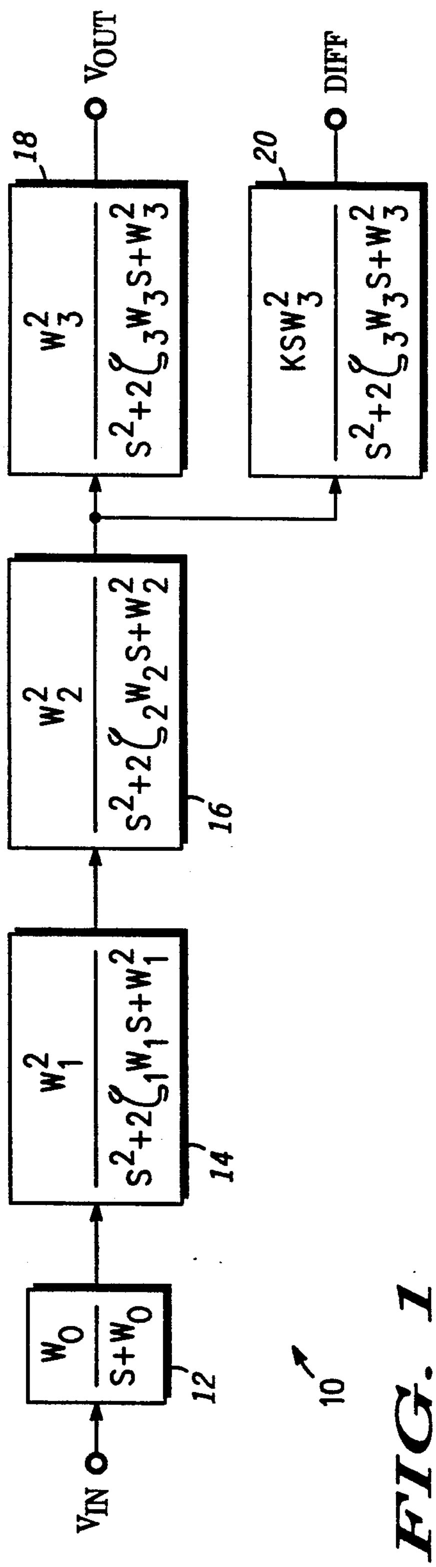
FIG. 1 is a simplified block diagram of a conventional differentiator.

A conventional filter circuit 10 is shown as prior art in FIG. 1 including filter stages 12, 14, 16 and 18 of a seven-pole Bessel filter responsive to an analog input signal $V_{IN}$ for providing a filtered output signal $V_{OUT}$. Filter stage 12 is a single real-pole filter tuned to a predetermined frequency $\omega_0$. Filter stages 14, 16 and 18 are each two-pole filters tuned to frequencies $\omega_1$, $\omega_2$ and $\omega_3$, respectively, with damping factors $\zeta_1$, $\zeta_2$ and $\zeta_3$. The transfer functions of filter stages 12–18 are shown in FIG. 1.

A differentiator filter stage 20 is coupled in parallel with the final two-pole filter stage 18 for providing a differentiated output signal DIFF. Differentiator stage 20 has a transfer function with the same denominator as filter stage 18 (i.e. matching natural frequency and damping factor) and a numerator with constant term K and a complex variable "s", the latter of which operates as a zero at DC and provides a 90° phase shift corresponding to the differentiation operation. Thus, the input signal $V_{IN}$ is filtered through stages 12–18 for providing the output signal $V_{OUT}$ and differentiated through stage 20 for providing the differentiated signal DIFF having a similar bandwidth as the output signal $V_{OUT}$. That is, the DIFF signal is a differentiated version of the output signal $V_{OUT}$.

One principle drawback of the differentiator implementation of FIG. 1 is the duplication of filter components in differentiator stage 20. The two-pole filter stages 14, 16, 18 and 20 use large capacitors, say five picofarads or more, which consumes a large physical area of an integrated circuit. Furthermore, the input signal $V_{IN}$ is typically differential for improved dynamic range, whereby differentiator stage 20 must use twice the number of components (i.e., 2 two-pole filter sections). Another difficulty is the effort in matching the natural frequency and damping factor between filter stage 18 and differentiator stage 20. Hence, it is desirable to eliminate differentiator filter stage 20 and its associated large bulky components from the integrated circuit.

DETAILED DESCRIPTION OF THE PREFERRED EMBODIMENT

Figure 2:
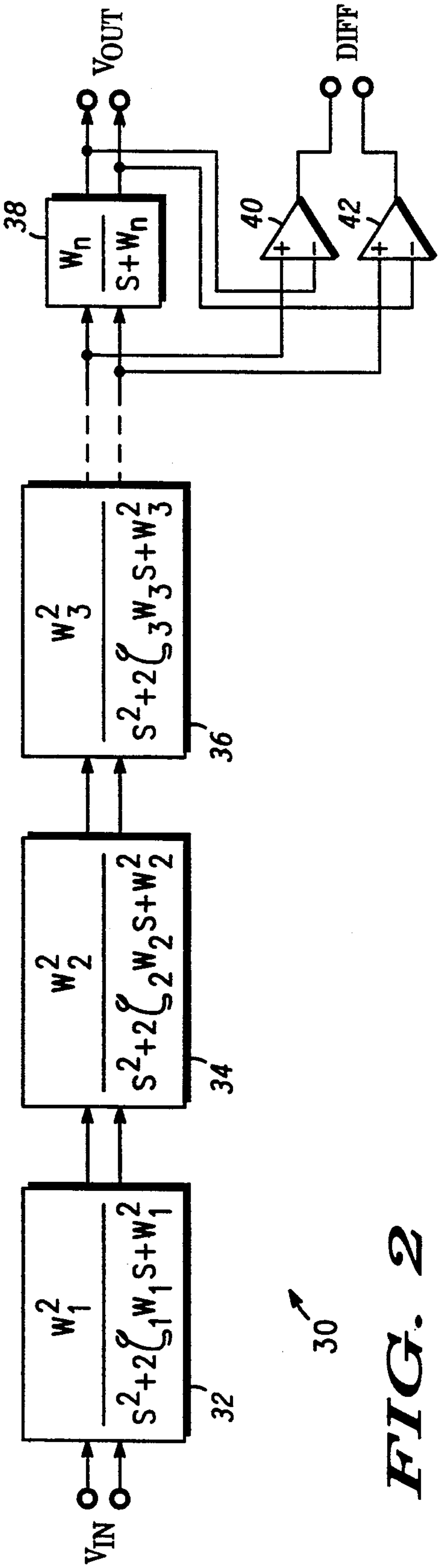
FIG. 2 is a block diagram illustrating a differentiator circuit in accordance with the present invention.

Referring to FIG. 2, there is shown differentiator circuit 30 in accordance with the present invention responsive to a differential input signal $V_{IN}$ applied to two-pole filter stage 32 which is tuned to a natural frequency of $\omega_1$ 1 with a damping factor $\zeta_1$. The output signal of filter stage 32 is processed through two-pole filter stages 34 and 36 each tuned to a natural frequency of $\omega_2$ and $\omega_3$, respectively, with damping factors $\zeta_2$ and $\zeta_3$. The output signal of filter stage 36 is processed through a single real pole filter stage 38, tuned to a frequency of $\omega_n$ for providing the differential output signal $V_{OUT}$. One example of filter stage 38 is disclosed in U.S. Pat. No. 4,996,498 and is hereby incorporated by reference.

Filter stages 32–38 make up a seven-pole Bessel or elliptic filter for filtering the differential input signal $V_{IN}$ and providing the differential filtered output signal $V_{OUT}$. The filter 32–38 may be used as the main signal processing filter for improving the signal-to-noise ratio of the analog signal $V_{IN}$ read from a disk drive. The transfer functions of filter stages 32–36 are shown in FIG. 2. The implementation of filter stages 32–36 given their transfer function is well known in the art Of filter design.

The filter 32-38 is shown by way of example. It is understood that other filter topologies may also be used. Furthermore, the input signal processing though filter stages 32-38 may be either differential or single-ended.

To achieve the differential output signal DIFF, the differential input signal of filter stage 38 is applied at the non-inverting inputs of differential amplifiers 40 and 42, while the differential output signal of filter stage 38 is applied at the inverting inputs of differential amplifiers 40-42, as shown. The single-ended outputs of differential amplifiers 40-42 is the differentiated output signal DIFF.

A mathematical explanation of the operation proceeds as follows. If the input signal $V_{IN}$ is assumed to be normalized to unity and filter stages 32-36 have a gain of one, then the differential output signal DIFF of differential amplifiers 40-42 is 1-(1*F(s)), where F(s) is the transfer function of filter stage 38.

$$DIFF = 1 - \left(\frac{\omega_n}{s + \omega_n}\right) \quad (1)$$

$$= \left(\frac{s}{s + \omega_n}\right) \quad (2)$$

The complex variable "s" in the numerator of equation (2) provides the differentiation for the output signal DIFF.

If the gain of filter stages 32-36 is not exactly unity, but rather $1-\epsilon$, where $\epsilon$ is the error term, then the subtraction process produces the following result as an approximate differentiation:

$$DIFF = \frac{1}{1-\epsilon}\left(\frac{s - \frac{\epsilon\omega_n}{1-\epsilon}}{s + \omega_n}\right) \quad (3)$$

Thus, differentiator circuit 30 provides a differential output signal DIFF by subtracting the input and output signals of the final stage 38 of filter 32-38. Differential amplifiers 40-42 are much more space efficient than the prior art differentiator stage 20 of FIG. 1. Furthermore, one need not be concerned with trying to match the natural frequency and damping factor between the final filter stage and the differentiator stage which is a problem in the prior art.

Figure 3:
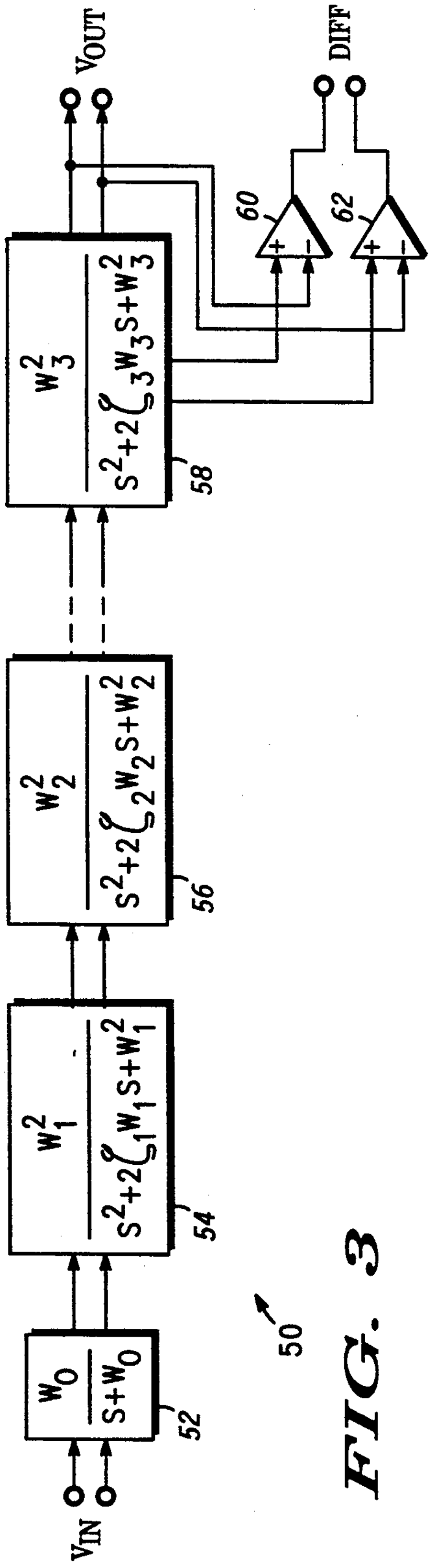
FIG. 3 is a block diagram illustrating an alternate embodiment of the improved differentiator circuit.

Turning to FIG. 3, an alternate embodiment is shown as differentiator circuit 50 responsive to a differential input signal $V_{IN}$ applied to a single real pole filter stage 52 which is tuned to a natural frequency of $\omega_0$. The output signal of filter stage 52 is processed through two-pole filter stages 54 and 56 each tuned to a natural frequency of $\omega_1$ and $\omega_2$, respectively, with damping factors $\zeta_1$ and $\zeta_2$. The output signal of filter stage 56 is processed through a two-pole filter stage 58, tuned to a frequency of $\omega_n$ with a damping factor $\zeta_n$ for providing the differential output signal $V_{OUT}$.

Filter stages 52-58 make up a seven-pole Bessel or elliptic filter for filtering the differential input signal $V_{IN}$ and providing the differential filtered output signal $V_{OUT}$. The transfer functions of filter stages 52-58 are shown in FIG. 3. The implementation of filter stages 52-58, given their transfer function, is well known in the art of filter design. The input signal processing though filter stages 52-58 may be either differential or single-ended.

Figure 4:
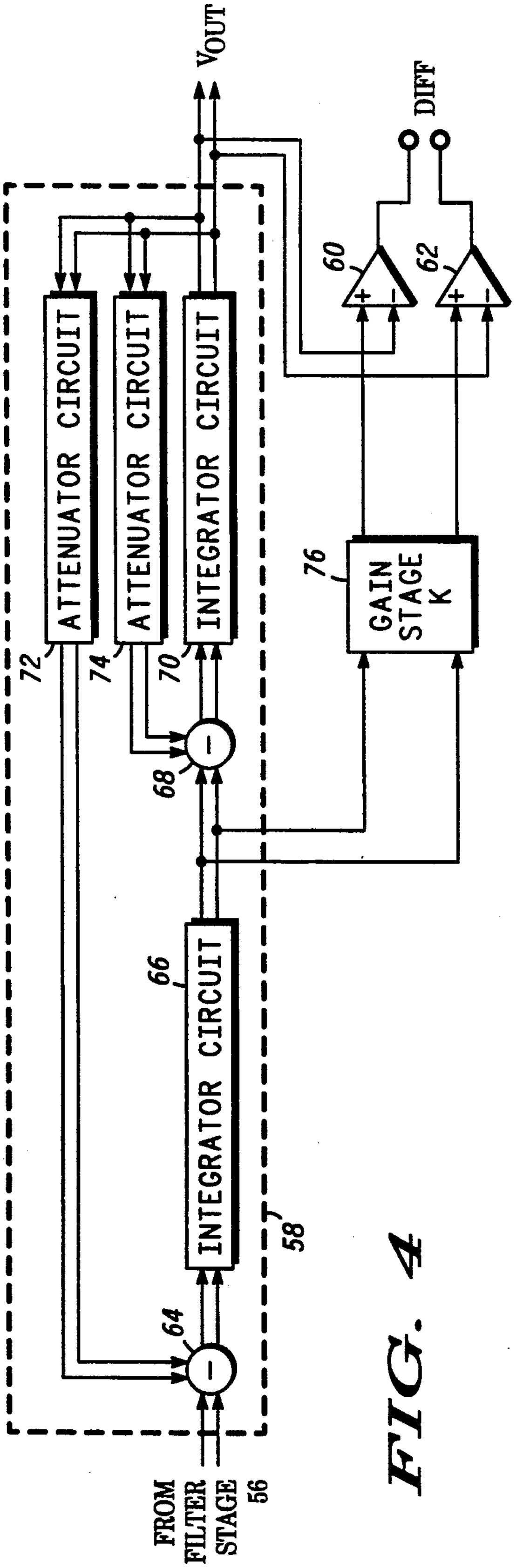
FIG. 4 is a block diagram of the final two-pole filter stage of FIG. 3.

An example of filter stage 58 is shown in FIG. 4 including subtracter circuit 64 having first differential inputs coupled to the differential outputs of filter stage 56 and having differential outputs coupled to integrator 66. The differential outputs of integrator 66 are applied at the first differential inputs of subtracter circuit 68, while the differential outputs of subtracter circuit 68 are applied at the inputs of integrator 70. The differential outputs of integrator 70, $V_{OUT}$, are coupled through attenuator circuit 72 to the second differential inputs of subtracter circuit 64 and through attenuator circuit 74 to the second differential inputs of subtracter circuit 68.

To achieve the differential output signal DIFF, the differential output signal of integrator 66 is applied through gain K stage 76 to the non-inverting inputs of differential amplifiers 60 and 62, while the differential output signal of integrator 70 is applied at the inverting inputs of differential amplifiers 60-62, as shown. The single-ended outputs of differential amplifiers 60-62 is the differentiated output signal DIFF.

It can be shown that the output signals of integrators 66 and 70 may be represented as per equations (4) and (5), respectively.

$$F_{IN}(s) = \frac{\omega_n s + 2\zeta_n\omega_n}{s^2 + 2\zeta_n\omega_n s + \omega_n^2} \quad (4)$$

$$F_{OUT}(s) = \frac{\omega_n^2}{s^2 + 2\zeta_n\omega_n s + \omega_n^2} \quad (5)$$

By adding a gain factor K to the $F_{IN}(s)$ transfer function, the differentiated output signal DIFF at the outputs of differential amplifiers 60-62 is given by:

$$DIFF = K^* F_{IN}(s) - F_{OUT}(s) \quad (6)$$

$$= \frac{K(\omega_n s + 2\zeta_n\omega_n) - \omega_n^2}{s^2 + 2\zeta_n\omega_n s + \omega_n^2} \quad (7)$$

Selecting $K = \frac{1}{2}\zeta_n$, equation (7) reduces to:

$$DIFF = \frac{K(\omega_n s)}{s^2 + 2\zeta_n\omega_n s + \omega_n^2} \quad (8)$$

The complex variable "s" in the numerator of equation (8) provides the differentiation for the output signal DIFF.

Thus, differentiator circuit 50 provides a differential output signal DIFF by subtracting the input signal (at output of integrator 66) and the output signal (at output of integrator 70) of the final stage 58 of filter 52-58. The poles of the differentiated signal DIFF are the same as the filtered output signal $V_{OUT}$ since it is derived from the output of filter stage 58. Again, differential amplifiers 60-62 are more space efficient than the prior art differentiator stage 20 of FIG. 1, and one need not be concerned with trying to match the natural frequency and damping factor between the final filter stage and the differentiator stage.

Hence, what has been provided is a novel differentiator circuit including a subtracter circuit for taking the difference between the input and output signals of the final stage of the main signal processing filter for providing a differentiated output signal having the same natural frequency and damping factor as the filtered output signal.

I claim:

1. A circuit for differentiating a differential input signal having first and second components, comprising:

first means for filtering the differential input signal and providing a filtered differential output signal having first and second components, said first means including a first filter having an input coupled for receiving the differential input signal and having an output for providing said filtered differential output signal; and second means for subtracting said filtered differential output signal of said first means applied at a first input from the differential input signal applied at a second input for providing a differentiated differential output signal at an output having first and second components, said second means including, (a) a first differential amplifier having first and second inputs and an output, said first input receiving said first component of the differential input signal, said second input receiving said first component of said filtered differential output signal from said first filter, said output providing said first component of said differentiated differential output signal, and (b) a second differential amplifier having first and second inputs and an output, said first input receiving said second component of the differential input signal, said second input receiving said second component of said filtered differential output signal from said first filter, said output providing said second component of said differentiated differential output signal.

2. The circuit of claim 1 wherein said first filter is a single pole filter.

3. The circuit of claim 1 wherein said first filter is a two-pole filter.

4. The circuit of claim 1 further including:

a second filter having an input coupled for receiving the input signal and having an output;

a third filter having an input coupled to said output of said second filter and having an output; and a fourth filter having an input coupled to said output of said third filter and having an output coupled to said input of said first means for filtering.

5. A circuit for differentiating a differential input signal having first and second components, comprising:

a first filter having an input coupled for receiving the differential input signal and having an output for providing a filtered differential output signal having first and second components a first differential amplifier having first and second inputs and an output, said first input receiving said filtered differential output signal, said output providing a differentiated differential output signal having a difference between the differential input signal and said filtered differential output signal, said first input of said first differential amplifier receiving said first component of the differential input signal, said second input of said first differential amplifier receiving said first component of said filtered differential output signal, said output of said first differential amplifier providing said first component of said differentiated differential output signal; and a second differential amplifier having first and second inputs and an output, said first input receiving said second component of the differential input signal, said second input receiving said second component of said filtered differential output signal, said output providing said second component of said differentiated differential output signal.

6. The circuit of claim 5 wherein said first filter is a single pole filter.

7. The circuit of claim 5 wherein said first filter is a two-pole filter.

8. The circuit of claim 5 further including:

a second filter having an input coupled for receiving the input signal and having an output;

a third filter having an input coupled to said output of said second filter and having an output; and a fourth filter having an input coupled to said output of said third filter and having an output coupled to said input of said first filter.

9. A circuit for differentiating an input signal, comprising:

a first subtracter circuit having first and second inputs and an output, said first input being coupled for receiving the input signal;

a first integrator circuit having an input coupled to said output of said first subtracter circuit and having an output for providing a first filtered output signal;

a second subtracter circuit having first and second inputs and an output, said first input being coupled to said output of said first integrator circuit for receiving said first filtered output signal;

a second integrator circuit having an input coupled to said output of said second subtracter circuit and having an output for providing a second filtered output signal;

a first attenuator circuit having an input coupled to said output of said second integrator circuit and having an output coupled to said second input of said first subtracter circuit;

a second attenuator circuit having an input coupled to said output of said second integrator circuit and having an output coupled to said second input of said second subtracter circuit; and second means for subtracting said second filtered output signal of said second integrator circuit as applied at a first input from said first filtered output signal of said first integrator circuit as applied at a second input for providing a differentiated output signal at an output.

10. The circuit of claim 9 wherein said first and second integrator circuits each include first and second inputs for receiving a differential signal and first and second outputs for providing a filtered differential output signal.

11. The circuit of claim 10 wherein said second means includes:

a first differential amplifier having first and second inputs and an output, said first input being coupled to said first output of said first integrator circuit, said second input being coupled to said first output of said second integrator circuit, said output providing a first component of said differentiated output signal; and a second differential amplifier having first and second inputs and an output, said first input being coupled to said second output of said first integrator circuit, said second input being coupled to said second output of said second integrator circuit, said output providing a second component of said differentiated output signal.

* * * * *

UNITED STATES PATENT AND TRADEMARK OFFICE
CERTIFICATE OF CORRECTION

PATENT NO. : 5,151,662

DATED : September 29, 1992

INVENTOR(S) : HANNA, John E.

It is certified that error appears in the above-identified patent and that said Letters Patent is hereby corrected as shown below:

In column 5, claim 5, line 54, please insert the words --the differential input signal, said second input receiving-- after the word "receiving" and before the word "said".

Signed and Sealed this

Twenty-fifth Day of January, 1994

Attest:

BRUCE LEHMAN

*Attesting Officer* *Commissioner of Patents and Trademarks*